May 16, 1933.  H. A. CEDERSTROM  1,909,755
SPRAYING AND DISTRIBUTING MEANS
Filed May 10, 1930
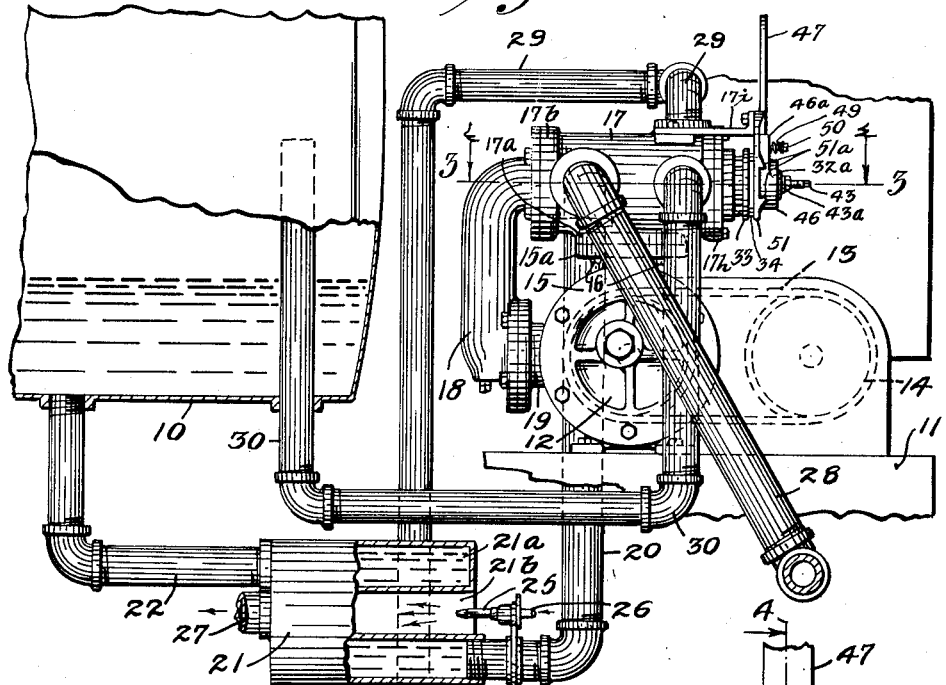
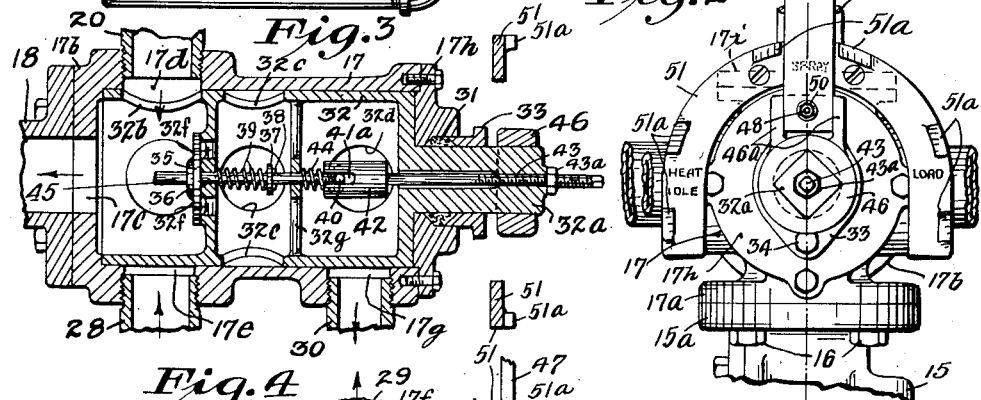
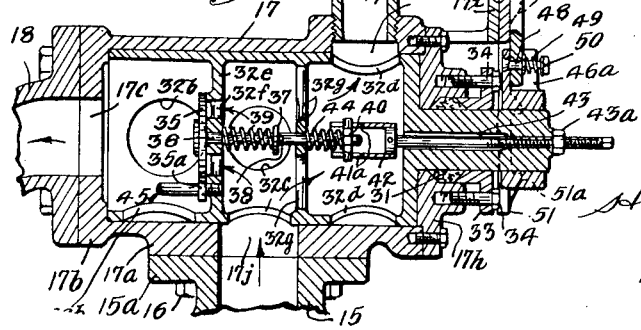
Inventor
Harold A. Cederstrom
By his Attorneys Patented May 16, 1933

1,909,755

UNITED STATES PATENT OFFICE

HAROLD A. CEDERSTROM, OF MINNEAPOLIS, MINNESOTA, ASSIGNOR, BY MESNE ASSIGNMENTS, TO THE ROSCO MANUFACTURING COMPANY, OF MINNEAPOLIS, MINNESOTA, A CORPORATION OF MINNESOTA

SPRAYING AND DISTRIBUTING MEANS

Application filed May 10, 1930. Serial No. 451,403.

This invention relates to a device for handling liquids and while the invention is capable of many applications, it particularly is designed for and is illustrated in connection with a machine for spraying oil on roads. As is well known, oil is now sprayed on roads for various purposes and it is desirable to have a machine which will do this quickly and efficiently. Such a machine usually comprises a tank or container for the oil and it is necessary to replenish this container at various times. The machine must of course be portable and a simple and efficient means is desirable to quickly change the machine to adapt it to the various operations of spraying or filling.

It is an object of this invention, therefore, to provide a very simple and efficient machine for handling liquids such as oil which machine can be operated to by-pass the oil through the container or tank to discharge the oil from the tank through the spraying device or to replenish the tank from some suitable oil supply.

It is another object of the invention to provide such a machine comprising a container, a pump and a distributing member cooperating with said pump adapted to be quickly changed in position to direct the oil from the pump to the desired place and to connect the inlet of the pump with the desired oil supply.

It is still another object of the invention to provide a distributing member comprising a casing having various openings, one of which is connected to the inlet side of the pump and the second of which is connected to the outlet side of the pump, together with a member oscillatable in said casing and having ports therein adapted to cooperate with the openings in said casing to direct the oil to the desired place and to connect the inlet of the pump with the desired oil supply.

It is a further object of the invention to provide a distributing device for liquids such as oil comprising a casing having an opening at one end adapted to be connected to the inlet side of a pump and having openings at said end adapted to be connected to pipes leading to a source of oil supply, said casing having another opening leading to the discharge side of the pump together with a member fitting in said casing and rotatable therein having ports adapted to cooperate with said openings and having a partition between the ports cooperating with the discharge side of said pump and the opening leading to the inlet side of said pump.

It is still another object of the invention to provide a distributing device for liquids such as oil comprising a casing having an opening connected to the inlet side of a pump and an opening connected to the discharge side of said pump, a sleeve or shell fitting in said casing having a partition therein disposed between said openings and shutting off communication therebetween, said casing having a pair of openings leading therefrom on the same side of said partition as said first mentioned opening and said shell having ports adapted alternately to align with said opening, said shell having ports adapted to alternately align with the opening leading to the discharge side of said pump, said casing having a pair of openings leading therefrom at the same side of said partition as the opening leading to the discharge side of said pump and said shell having ports adapted alternately to align with said last mentioned openings.

It is still a further object of the invention to provide such a device as set forth in the preceding paragraph, said partition having openings therein normally closed by a spring pressed valve constituting a relief valve together with means for varying the spring pressure on said valve.

It is also an object of the invention to provide a distributing device for liquids, such as oil, comprising a casing having six outlets, one of which is connected to the discharge side of a pump and the other of which is connected to the inlet side of a pump, together with a rotatable shell in said casing having ports adapted to align with said outlets at various times to variously connect said outlets to the inlet and discharge sides of said pump, together with means for moving said shell and holding the same in different positions.

These and other objects and advantages of the invention will be fully set forth in the following description made in connection with the accompanying drawing, in which like reference characters refer to similar parts throughout the several views, and in which:—

Fig. 1 is a view in side elevation of the device, some parts being broken away and others shown in vertical section;

Fig. 2 is a partial view in end elevation as seen from the right of Fig. 1;

Fig. 3 is a horizontal section taken on line 3—3 of Fig. 1 as indicated by the arrows, and Fig. 4 is a vertical section taken on line 4—4 of Fig. 2 as indicated by the arrows.

Referring to the drawing, a portion of a machine for oiling roads is shown which machine is usually mounted on a truck or wheeled structure, not shown, the parts shown comprising an oil tank or container 10, which will be suitably supported on said vehicle. A portion of a platform 11 is shown and on this is mounted a rotary pump 12 shown as driven by a belt or chain 13 from a motor 14. The particular type of motor and pump used form no part of the present invention and the same will not be further described. The pump has an outlet or discharge conduit 15 having a flange 15a thereon which is connected by the headed and nutted bolts 16 to a flange 17a formed on the casing 17 of a distributing device. Casing 17 has a flange 17b at one end and this flange is connected to the flange at one end of a conduit 18, the other flanged end of which is bolted to the flanged end of a discharge conduit 19 leading to pump 12. Casing 17 has an opening 17c at one end connecting with conduit 18 as shown in Figs. 3 and 4. Casing 17 has at the other side adjacent flange 17b an opening 17d extending therefrom, the same extending through a hub formed on said casing in which hub is threaded a pipe 20. Pipe 20 extends downward from casing 17 and extends at right angles at its lower end, the same being threaded into a portion of an oil heating device or drum 21. Drum 21 has an annular chamber 21a at its outer side and a passage 21b through the center thereof. As shown in Fig. 1, pipe 20 is connected to the lower side of annular chamber 21a. A pipe 22 which is in effect a continuation of pipe 20 is secured in the upper side of chamber 21a and at the end of the drum opposite to that in which pipe 20 is secured. Pipe 22 extends upwardly and is threaded into a hub shown on the bottom of tank or container 10. A collar 23 surrounds pipe 20 and has a bracket 24 secured thereto adapted to support an oil burner or torch 25 connected by a suitable pipe 26 to some supply of oil. An outlet pipe 27 is shown at the other end of passage 21b for the products of combustion which pipe may lead to any desired point. Casing 17 has an opening 17e at the side opposite 17d also passing through a hub formed on said casing in which hub is threaded a pipe 28. Pipe 28 extends downwardly and will be connected to a pipe or flexible conduit adapted to extend into some oil supply such as a tank, car or a large oil supply tank. Said pipe is shown as broken away in Figs. 1 and 3. Casing 17 also has an opening 17f shown as in the top thereof, said opening extending through a hub formed on said casing in which hub is threaded a pipe 29. Pipe 29 extends laterally and then longitudinally of casing 17 as shown in Fig. 1, the same then extending downwardly and again horizontally, said pipe being connected in the machine to the spraying device for the oil. Casing 17 has still another opening 17g shown at the same side thereof as opening 17e, but at the opposite end of the casing, said opening 17g extending through a hub formed on casing 17 in which hub is threaded a pipe 30, said pipe extending downwardly and horizontally and then extending vertically through a hub formed on the bottom of tank 10, said pipe extending upwardly in said tank some distance as shown in Fig. 1. Pipe 30 of course makes a tight fit with tank 10. Casing 17 has a head 17h bolted to the end thereof, opposite flange 17b, said head having a central hub bored to form a packing gland receiving packing material 31. Casing 17 has a central bore and a shell or sleeve 32 is fitted in this bore, said sleeve having its end adjacent opening 17c open and having its other end closed and having a projecting hub 32a extending through head 17h, a packing gland 33 surrounding hub 32a and extending into the bore of head 17h to pack material 31 therein. Gland 33 is held in place and adapted to be moved by headed bolts 34 extending through the flange thereof and threaded into head 17h. Head 17h has a flange 17i extending some distance therefrom which has a vertically extending surface for a purpose to be later described. Sleeve 32 has a pair of ports 32b adapted alternately to align with or register with the openings 17d and 17e, these ports being 90 degrees apart. Sleeve 32 also has three ports 32c disposed 90 degrees apart, one of which is always in communication with the opening 17j in the bottom of casing 17 which is connected to the discharge conduit 15 of the pump 12. Shell 32 also has a pair of ports 32d adjacent its closed end adapted alternately to align with openings 17f and 17g in casing 17, said ports being 180 degrees apart. Shell 32 also has a partition 32e between ports 32b and 32c which partition has a plurality of circumferentially spaced openings 32f therethrough. Partition 32e is finished at one side and a plate 35 engages said side so as to close the openings 32f, said plate forming a valve and being secured to a headed rod 36 extending through and fitting a bore in partition 32e and also extending through a hub formed in a rib 32g extending transversely of member 32. Rod 36 has a collar 37 thereon held by a pin 38 and a coiled spring 39 surrounds said rod bearing at one end against collar 37 and at its other end against the partition 32e. The end of rod 36 is threaded and has thereon a nut 40 having oppositely projecting arms or pins extending through slots 41a formed in the opposite sides of a cylindrical member 42, said member having a closed end in which is axially secured a rod 43 extending through a bore formed centrally in hub 32a, the outer end of said bore being threaded and rod 43 being also threaded at its outer end and screwed into said threaded portion. The outer end of rod 43 is squared for the application of a wrench and a jamb nut 43a is threaded thereon engaging the outer end of hub 32a. Another coiled spring 44 surrounds rod 36 one end bearing against a central hub in bar 32g and its other end bearing against nut 40. Plate 35 has an extension 35a at its bottom slotted to embrace a rod 45 threaded into partition 32e. The outer end of hub 32a is of polygonal formation in cross section, being square as shown in Fig. 2 and the same receives a member 46 having a square aperture therethrough and having an upwardly projecting portion 46a having side and rear portions thus forming a socket or recess in which is disposed the lower end of a handle lever 47. A bolt 48 has its head countersunk in the rear side of portion 46a on which bolt handle 47 is pivoted, said bolt having a coiled spring 49 surrounding the same at the outer side of and bearing against the handle and bearing at its other end against a nut 50 on bolt 48. Flange 17i has secured thereto a plate 51 which is of inverted horseshoe or U-shape and which has three pairs of spaced, outwardly-projecting lugs 51a. The lugs of these pairs are spaced apart sufficiently to freely receive handle 47 therebetween. Plate 51 has certain legends thereon adjacent said pairs of lugs, the same being respectively "Heat-Idle", "Spray", and "Load".

In operation, motor 14 will be driven to drive the pump 12. As stated, the device is mounted upon a truck and the tank 10 must be provided with a supply of oil. Pipe 28 therefore will be connected to some suitable supply of oil, such as a tank car or other tank and handle 47 will be pulled outwardly against the tension of spring 49 so as to swing past the lugs 51a and will be moved in between the pair of lugs 51a designated "load". Handle 47 swings member 46, which in turn rotates hub 32a and shell 32 to bring certain of the ports in said shell into alignment with certain of the openings in casing 17. At this time one of the ports 32b will register with the opening 17e leading to pipe 28 and one of the ports 32d will register with opening 17g leading to pipe 30. The openings 17d and 17f will be closed by the wall of shell 32. As pump 12 operates, oil will be drawn in through pipe 28, will pass through opening 17c and conduit 18 to the pump and will be discharged from the pump through opening 17j and will pass from shell 32 through pipe 30 and into tank 10. This operation will continue until the desired amount of oil is loaded into tank 10. If it is desired to keep the motor running, handle 47 will then again be pulled outwardly and rotated over to lugs 51a marked "Heat, Idle". This rotates shell 32 to another position so that one of the ports 32b aligns with opening 17d leading to pipe 20, opening 17e leading to pipe 28 being closed by the wall of the shell as shown in Fig. 3. One of the openings 32d is now in alignment with opening 17g leading to pipe 30. The pump will then draw oil through pipes 22 and 20 into shell 32, from said shell through conduit 18 to the pump which oil will be discharged from the pump through conduit 15 and into shell 32 through the openings 17j and 32c, one of latter always registering with opening 17j. The oil will be discharged through opening 17g and pipe 30 and will pass back into the tank. The oil is thus being merely circulated from the tank through pipes 22 and 20 and back to the tank through pipe 30, the oil passing through the heating drum 21. If it is desired to heat the oil, burner 25 can be lighted and the oil will be heated as it is passed through the drum 21. This position of shell 32 therefore is either for idling or by-passing the oil or for heating the oil. When it is desired to spray the oil on the road, as when the machine is in spraying operation, handle 47 will be swung in between lugs 51a marked "Spray". This rotates shell 32 to the position shown in Figs. 3 and 4 and in which one of the ports 32b aligns with opening 17d leading to pipe 20 and in which one of the ports 32d is aligned with opening 17f leading to pipe 29. Openings 17e and 17g will at this time be closed by the wall of shell 32. Oil is now pumped from tank 10 through pipes 22, drum 21 and pipe 20 into shell 32 out through opening 17c and conduit 18 to the pump and said oil is discharged from the pump through member 15 opening 17j and port 32c into the shell 32. From the shell the oil is discharged through opening 17f and pipe 29 and from pipe 29 to the spraying devices which are disposed over the road on which the oil is sprayed. It will thus be seen that by merely swinging the handle 47 the oil can be controlled and delivered to the desired place. The spring 49 holds the handle 47 between the lugs 51a so that it is securely held in the position to which it is moved. Plate 35 acts as a relief valve for the oil and should the pressure become sufficiently great, the oil will push plate 35 outwardly against the tension of springs 39 and 44. It will be seen that spring 39 exerts a constant pressure or tension on rod 36 and the plate 35 and spring 44 exerts an additional pressure. The tension of spring 44 can be varied by turning rod 43 by means of a wrench applied to its end. This turns member 42 which in turn turns the nut 40 screwing the latter inwardly or outwardly on rod 36 and thus varying the tension of spring 44. The desired pressure can thus be put on the relief plate or valve 35. The relief valve 35 is quite important in the type of machine disclosed. The motor can be run at constant speed and the same pressure maintained on the oil for spraying no matter how many nozzles are being used or how much of the spraying capacity is being used. It is the common practice at times to spray a greater volume of oil than is sprayed at other times. The natural tendency would be for the pressure to decrease with the increase in volume. However, by providing plate 35 and by-passing a portion of the oil pumped, a uniform pressure can be maintained on the oil no matter what volume is being actually sprayed through the spraying device. It will also be noted that the pipes 15, 18, 19, 20, 28 and 30 have substantially the same diameter as the diameter of the openings through shell 32. There is thus no choking effect on the oil after it is handled in the distributing member. The oil is handled much more easily by having the pipes of such diameter.

From the above description it is seen that applicant has provided a very simple and efficient liquid or oil handling apparatus and one having particular utility in connection with a spraying machine. As stated, the desired relation of the pump and conduits can be obtained by merely swinging the handle 47. The oil can be quickly and easily heated when desired. The device is very compact and can be made very rugged and durable. The same has been amply demonstrated in actual practice and found to be very successful. The device is being commercially manufactured.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. In a liquid distributing apparatus, a casing having an opening at one end adapted to be connected to the inlet side of a pump, openings at opposite sides adjacent said end, an opening at its central portion adapted to be be connected to the discharge side of said pump, a revoluble shell fitting said casing having an open end adjacent said end of said casing and having ports adjacent said end adapted alternately to open and close said openings adjacent said end of said casing, said shell having ports adjacent its central portion adapted respectively to be in communication with said opening at the central portion of said casing, said shell having a partition between said ports adjacent said end and said ports adjacent said central portion and having an opening through said partition and a spring-pressed plate covering said last mentioned opening adapted to yield under sufficient pressure.

2. The structure set forth in claim 1, a spring of constant tension holding said plate in position to close said opening through said partition and a second spring holding said plate in such position and means for varying the tension of said second spring.

3. A liquid distributing valve, comprising a barrel-like casing having first and second inlet openings adjacent a first end thereof, a first outlet opening adjacent but spaced from said first and second inlet openings, a third inlet opening spaced toward a second end of said casing from said first three mentioned openings, second and third outlet openings adjacent said second end and spaced from said third inlet opening, said first outlet opening being adapted to be placed in communication with the inlet side of a pump and said third inlet opening being adapted to be placed in communication with the outlet side of the pump, a shell fitting within said casing and movable to three different positions, said shell having a partition closing communication between said three first mentioned openings and said three last mentioned openings, said shell having ports respectively in communication with said first outlet opening and said third inlet opening when said shell is in any one of said three positions and having ports affording communication with said first inlet opening only when said shell is in two of said three positions and affording communication with said second inlet opening only when said shell is in the remaining of said three positions, said shell having other ports affording communication with said second outlet opening only when said shell is in two of its three positions and affording communication with said third outlet opening only when said shell is in the remaining of its three positions.

4. The structure defined in claim 3, and a pressure relief valve in said partition normally closed but affording communication between the two sides of said partition when the pressure at the side of said partition adjacent the second end of said casing exceeds the pressure at the side of said partition adjacent the first end of said casing by a certain predetermined amount.

5. The structure defined in claim 3, and a pressure relief valve in said partition normally closed but affording communication between the two sides of said partition when the pressure at the side of said partition adjacent the second end of said casing exceeds the pressure at the side of said partition adjacent the first end of said casing by a certain predetermined amount, said pressure relief valve including a spring holding the same closed and means operable from outside of said casing for varying the tension of said spring.

6. The structure defined in claim 3, and means for by-passing fluid from the side of said partition adjacent the second mentioned end of said casing to the side of said partition adjacent the first mentioned end of the casing when the pressure at the side of the partition adjacent the second mentioned end of the casing exceeds the pressure at the side of the partition adjacent the first mentioned end of the casing by a predetermined amount.

7. In a liquid distributing apparatus, a casing having first and second openings adjacent one end of the same, a third opening adjacent but spaced from said first and second openings, a fourth opening spaced toward the remaining end of said casing from said first three mentioned openings, fifth and sixth openings also spaced from said first three mentioned openings toward the last mentioned end of said casing and spaced from said fourth opening, a revoluble shell fitting said casing and affording communication with said third opening and said fourth opening when swung to different positions, said shell having ports adjacent the first mentioned end of said casing adapted alternately to open and close said first and second openings and said shell having ports adjacent the last mentioned end of said casing adapted to alternately open and close said fifth and sixth openings, said shell having a partition between said first mentioned ports and said last mentioned ports and pressure responsive by-pass means allowing communication of the fluid at one side of said partition with the fluid at the other side thereof when the pressure of the fluid at the one side of the partition exceeds the pressure of the fluid at the other side of the partition by a predetermined amount.

In testimony whereof I affix my signature.

HAROLD A. CEDERSTROM.